United States Patent [19]

Hersey

[11] Patent Number: 5,144,487
[45] Date of Patent: Sep. 1, 1992

[54] PORTABLE LASER DEVICE FOR ALIGNMENT TASKS

[75] Inventor: William H. Hersey, Corte Madera, Calif.

[73] Assignee: Pacific Laser, San Francisco, Calif.

[21] Appl. No.: 753,724

[22] Filed: Sep. 3, 1991

[51] Int. Cl.$^5$ .......................... G02B 27/14; G01B 11/26
[52] U.S. Cl. ................................. 359/629; 359/633; 356/138
[58] Field of Search ............... 356/138, 152, 149, 148, 356/250; 359/629, 633

[56] References Cited

U.S. PATENT DOCUMENTS

| | | | |
|---|---|---|---|
| 3,588,249 | 6/1971 | Studebaker | 356/4 |
| 3,729,266 | 4/1973 | Mason et al. | 356/250 |
| 3,771,876 | 11/1973 | Ljungdahl et al. | 356/250 |
| 3,856,409 | 12/1974 | Cindrich et al. | 356/138 |
| 3,897,637 | 8/1975 | Genho | 33/227 |
| 3,936,197 | 2/1976 | Aldrink et al. | 356/250 |
| 4,062,634 | 12/1977 | Rando et al. | 356/149 |
| 4,183,667 | 1/1980 | Denton | 355/250 |
| 4,221,483 | 9/1980 | Rando | 356/250 |
| 4,333,242 | 6/1982 | Genho | 33/227 |
| 4,448,528 | 5/1984 | McManus | 356/250 |
| 4,679,937 | 7/1987 | Cain et al. | 356/138 |
| 4,781,457 | 11/1988 | Hirano et al. | 356/250 |
| 4,852,265 | 8/1989 | Rando et al. | 356/138 |
| 4,912,851 | 4/1990 | Rando et al. | 33/227 |

Primary Examiner—Jon W. Henry
Attorney, Agent, or Firm—Heller Ehrman White & McAuliffe

[57] ABSTRACT

A portable, battery powered, self-levelling alignment tool for simultaneously indicating level, plumb and square. A projection unit including a laser diode, a collimator, and an optical system is located in a projection unit which is pendulously suspended inside a housing. The optical system divides a collimated beam from the laser diode and the collimator into output beams having a generally perpendicular relationship with each other. The projection unit may be balanced such that at least one of the output beams is substantially level and other beams thus indicate plumb or square.

9 Claims, 6 Drawing Sheets

PORTABLE LASER DEVICE FOR ALIGNMENT TASKS

BACKGROUND OF THE INVENTION

The present invention is directed generally to laser alignment systems. It is directed in particular to a compact, portable laser alignment tool which may simultaneously indicate level, plumb, and square alignment.

A portable, rugged, inexpensive, self-leveling laser device, capable of simultaneously indicating level, plumb and square alignment would be a very useful tool for the construction and carpentry trade. There have been a number of laser alignment devices disclosed which employ lasers. None of the devices, however, include all of the desired features of portability, self leveling and the ability to provide the simultaneous indication of the three principle alignment directions, i.e. level, plumb, and square.

U.S. Pat. No. 4,448,528 discloses a helium-neon laser pendulously suspended from a gimbal attached at one end of the laser. The suspended laser is surrounded by a windshield and the whole structure is mounted on a tripod. The device relies on beams emerging from each of the two ends of the helium neon laser to define an alignment line. The laser requires an external power source, potentially limiting its use to areas where external power is available.

Laser alignment devices have also been designed with a laser diode and battery power. Battery-powered devices do not require an external power source and may be used in virtually any location. For example U.S. Pat. Nos. 4,221,483; , 4,679,937; and U.S. Pat. No. 4,912,851 discloses a variety of portable surveying tool concepts. All include a light source and at least one other optical element. Pendulous suspension of either the optical element, or elements, is used to provide a self leveling capability for the tools. For example, U.S. Pat. No. 4,912,851 discloses a battery powered tool, utilizing a visible laser diode, which is self-levelling and capable of producing alignment beams indicating level and plumb directions, albeit not simultaneously. The alignment beams are switched between the level and plumb directions by manually rotating a knob on the side of the tool. The self-levelling feature of the tool is accomplished by pendulously suspending optical elements which are used to divide and direct the alignment beams. The laser diode and collimating optics are mounted in the tool separate from the pendulously suspended optical elements. A complex tilt compensation arrangement is required to compensate for changes in relative position of the laser and collimating optics, and the pendulously suspended optical elements which occur when the tool is placed on a non-level surface. A variety of tilt compensation arrangements are described in detail U.S. Pat. No 4,912,851. It is believed that a tilt compensation mechanism effective for three principle alignment directions simultaneously may be more complex than those disclosed in U.S. Pat. No 4,912,851.

Accordingly it is an object of the present invention to provide an alignment tool which does not require a tilt-compensation mechanism.

It is another object of the present invention to provide a rugged compact laser tool for projecting alignment lines which may be used to simultaneously establish level, plumb and square alignment directions.

SUMMARY OF THE INVENTION

Objects of the invention are accomplished by incorporating, in an alignment tool, within a single pendulously suspended projection unit, a laser diode, collimating optics and optics for dividing and directing output beams mounted in a fixed relationship to each other. Thus there is no relative movement between the laser and collimating optics and the optics for dividing and directing the output beams when the tool is placed on a non-flat surface. Damping means are provided for damping prolonged pendular motion of the projection unit.

The invention comprises a housing capable of being located on a substantially flat surface. Located inside the housing is a projection unit, including a laser providing visible light, collimating optics for forming the visible light into a collimated beam, and optical elements for dividing the beam into at least three output beams arranged in a generally-perpendicular relationship with each other. The projection unit is pendulously suspended within the housing. Damping means are provided for damping pendular motion of the projection unit. The output beams are projected from the housing to form alignment lines. The alignment lines may be used to simultaneously indicate level, plumb and vertical. The alignment may be accurate to less than one-eighth of one inch in forty feet.

Four output beams may be projected, two of which are projected from the housing in opposite directions but substantially in alignment with each other so that any one of the two may be directed at a reference point.

Five output beams may be projected, two of which are projected in opposite directions but substantially aligned with each other to form a first alignment line, and another two of which are projected in opposite directions but substantially in alignment to form a second alignment line substantially perpendicular to the first alignment line. The remaining fifth beam is projected from the housing to form a third alignment line substantially perpendicular to the first and second alignment lines.

DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
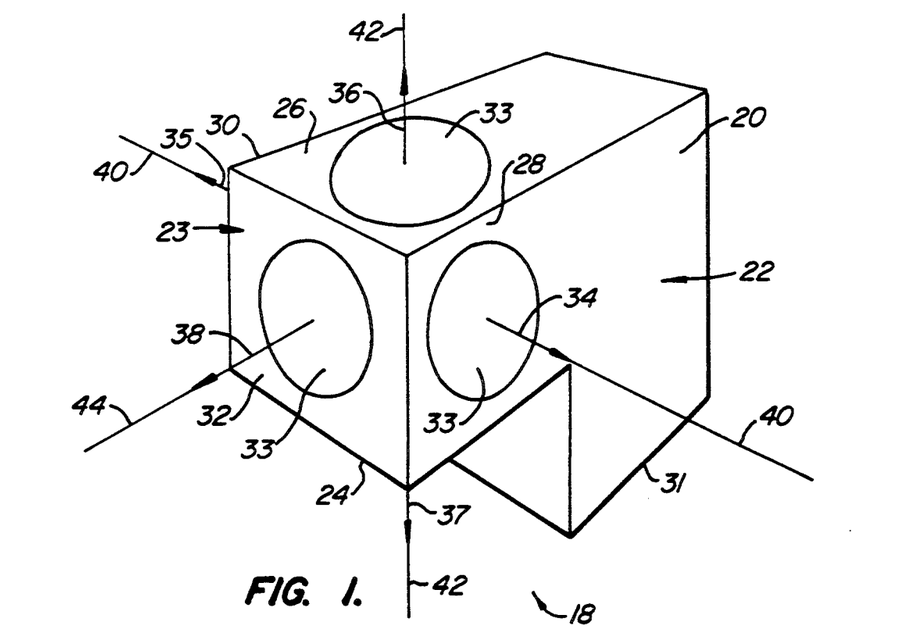
FIG. 1 schematically illustrates a general view of the present invention and the alignment beams.
Figure 2:
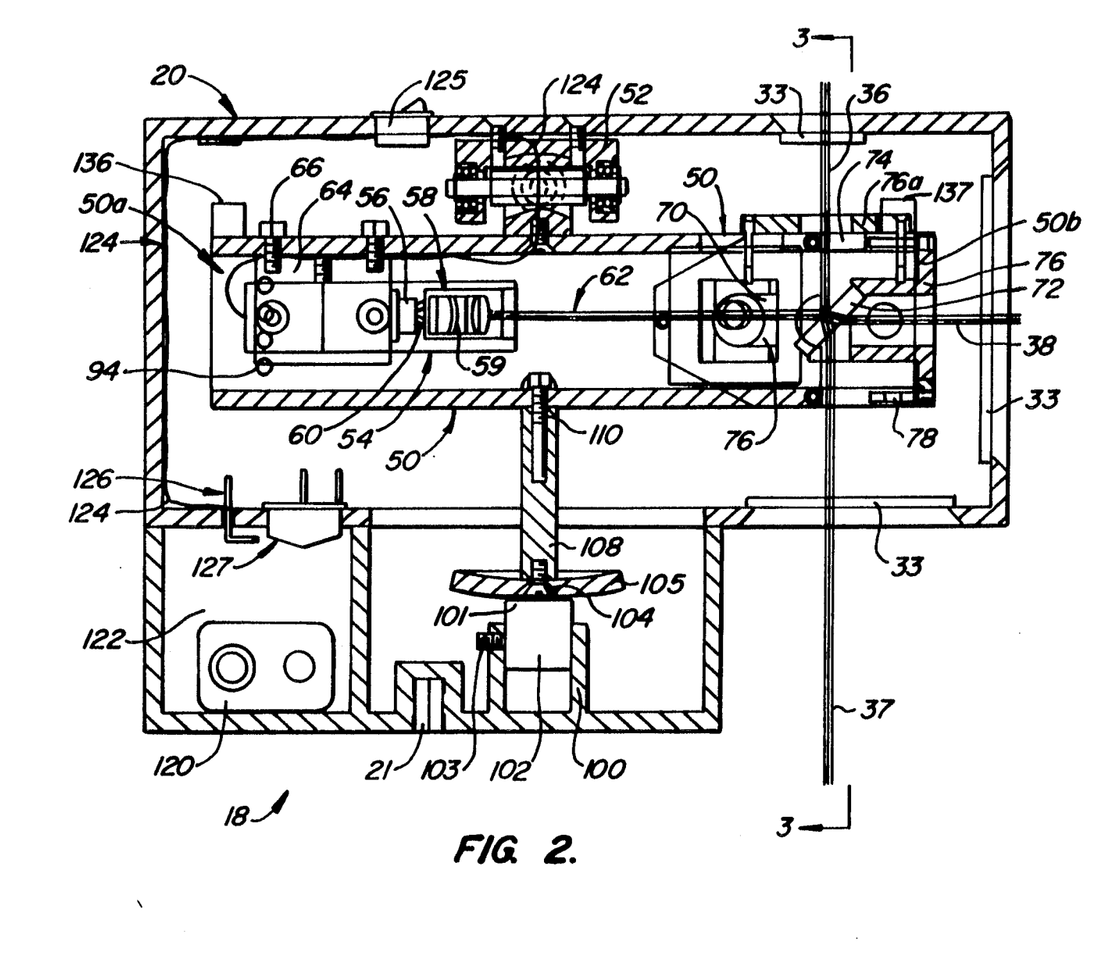
FIG. 2 schematically illustrates a generally cross sectional side elevation of a preferred embodiment of the present invention.
Figure 3:
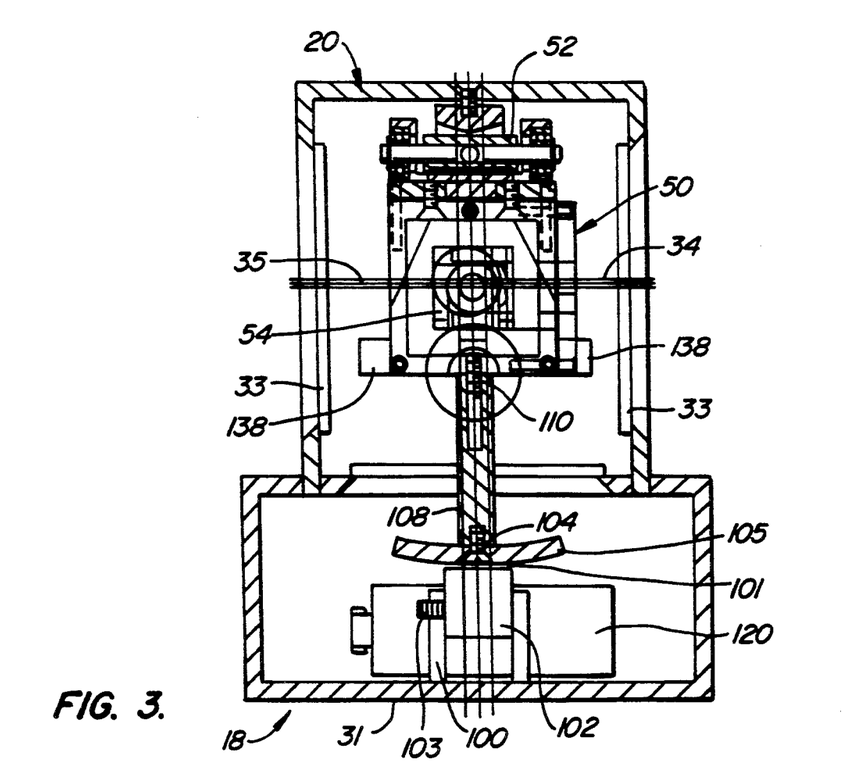
FIG. 3 schematically illustrates a cross sectional front elevational view taken in the direction 3—3 of FIG. 2.

Referring now to the drawings, wherein like components are given like reference numerals, a preferred embodiment of the present invention is illustrated generally by FIG. 1 and in detail by FIGS. 2 and 3. An alignment tool designated generally by the general numeral 18 includes a housing 20 having a box-shaped portion 22 extended at the front to form a smaller box-shaped nose portion 23. The housing has substantially flat upper and lower walls 24 and 26, flat side walls 28 and 30, a base 31, and a flat front wall 32. Windows 33 may be included, substantially opposite each other, in upper and lower walls 24 and 26, substantially opposite each other in side walls 28 and 30, and in the front wall 32. Output beams 34-38 are projected through windows 33 to form alignment lines. The beams 34-38 have a substantially perpendicular arrangement with each other. Beams 34 and 35 are projected from housing 20 in opposite directions, but substantially in alignment with each other, to form a first horizontal alignment line 40. Beams 36 and 37 are projected from housing 20 in opposite directions, but substantially in alignment with each other, to form a vertical alignment line 42 substantially perpendicular to horizontal alignment line 40. Beam 38 is projected through window 33 in front wall 32 to form a second horizontal alignment line 44. Horizontal line 44 is substantially perpendicular to horizontal alignment line 40 and vertical alignment line 42. Thus, either alignment line 40 or alignment line 44 may be used to indicate level, and both alignment lines 40 and 44 may be used to indicate square in a horizontal plane. Alignment lines 40 and 42 may be used to indicate square in a vertical plane. Alignment line 42 may be used to indicate plumb.

The tool 18 may be used, for example, by setting base 31 on a flat surface which has a reference point thereon. Beam 37 may then be located on the reference point and thus any point on alignment line 42 will be vertically located above the reference point.

Generally any of the output beams 34-38 may be used to locate a reference point from which vertical or horizontal alignment is to be established. Thus, tool 18 may be mounted on a separate stand remote from a reference point from which alignment is to be established. Housing 20 may include a threaded hole 21 for mounting tool 18 on a tripod or a bracket.

The tool 18 includes a projection system or unit for projecting alignment lines, wherein a light source and all necessary optical components for projecting the alignment lines are mounted in a fixed relationship to each other, preferably in a single unit. The projection unit may include a laser diode for providing visible light, a collimator for forming the visible light into a collimated beam and optical elements for dividing and directing the collimated beam into output beams for forming the alignment lines.

As shown in FIG. 2, a projection unit 50 is pendulously suspended from housing 20 by a gimbal mount 52. Projection unit 50 is in the form of a tube having a substantially square cross-section. Mounted fixedly within projection unit 50 is a laser unit 54 also having a square cross section. Laser unit 54 includes a laser diode 56 and a collimator 58. Laser diode 56 may be selected to emit visible light having a wavelength between about 600 and 700 nanometers (nm). Laser diode 56 may, for example, be a model TOLD 9211 or TOLD 9215 available from Toshiba America Electronic Components Inc. of Irvine, CA which emits visible light at a wavelength of 670 nm. The model Told 9211 emits light at a power of 5 milliwatts (mW) and the model 9215 emits light at a power of 10 mW. Collimator 58 may include one or more optical elements 59 (four are shown) for converting visible light 60 from laser diode 56 into a collimated beam 62. Collimator 58 may, for example be a model number 336-027 lens, having four elements, available from Optima Precision Inc. of West Linn, OR. Optics tube 54 is mounted in projection unit 50 by a bracket 64 and screws 66.

Collimated beam 62 is divided and directed into five output beams 34-38 by an optical system. It includes beamsplitters 70 and 72 which are aligned at forty-five degrees (45°) to collimated beam 62, and beamsplitter 74 which is aligned normal to the direction of collimated beam 62. The beamsplitters are bonded to mounts 76 and 76a which are attached to projection unit 50 by very fine threaded screws 78. The fine threaded screws facilitate precise alignment of mounts 76 and 76a. The beamsplitters 70, 72, and 74 may be all dielectric multilayer beamsplitters having essentially negligible absorption of visible light.

Figure 4:
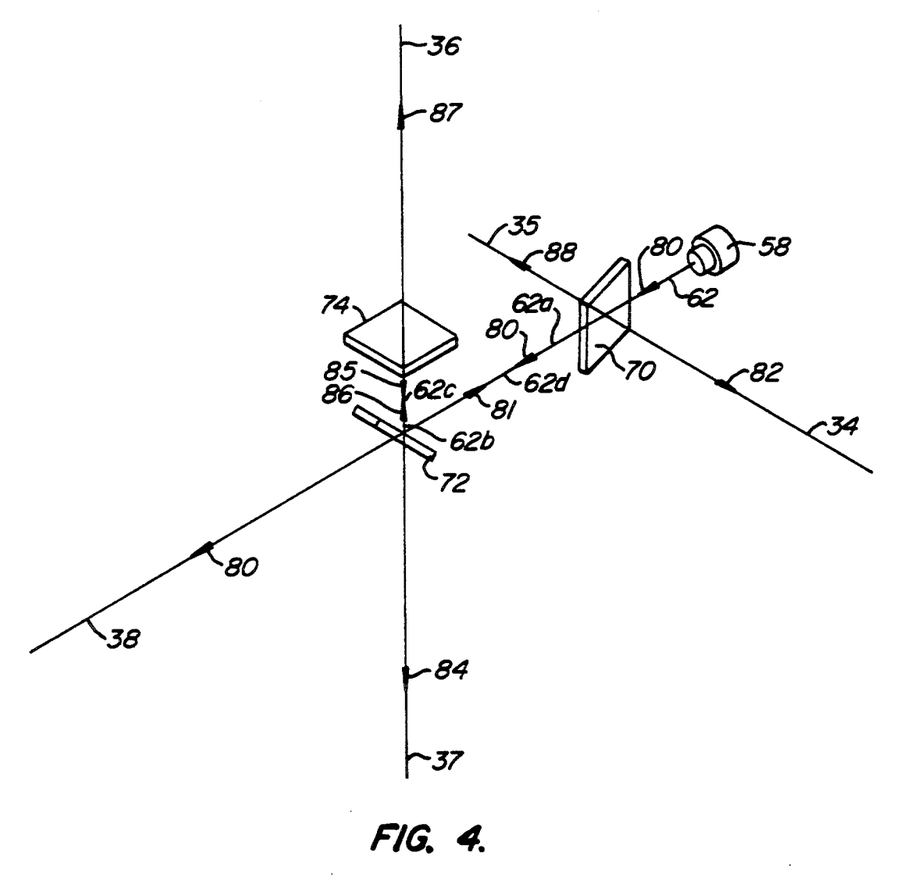
FIG. 4 schematically illustrates an optical system for dividing a collimated beam into five output beams.

Referring now to FIG. 4, an optical system for producing five output beams is shown in an exploded view. Mounts 76 and 76a are omitted for clarity. Here collimated beam 62 is shown emerging from collimator 58 in the direction of arrow 80. Beam 62 is first incident on beamsplitter 70 where approximately twenty-five percent of beam 62 is reflected in the direction of arrow 82 to form output beam 34. The remainder of beam 62, that is, beam 62a is transmitted by beamsplitter 70 and proceeds in the direction of arrow 80 until it is incident on beamsplitter 72. Beamsplitter 72 reflects about seventy percent of beam 62a in the direction of arrow 86 to form beam 62b. About thirty percent of beam 62a is transmitted in the direction of arrow 80 to form output beam 38. Beam 62b continues in the direction of arrow 86 until it is incident on beamsplitter 74 where about fifty percent of beam 62b is transmitted an continues in the direction of arrow 87 to form output beam 36. About fifty percent of beam 62b is reflected by beamsplitter 74 in the direction of arrow 85 as beam 62c. Beam 62c is incident on beamsplitter 72 where about thirty percent is transmitted in the direction of arrow 84 to form output beam 37. About 70 percent of beam 62c is reflected by beamsplitter 72 in the direction of arrow 81 to form beam 62d. Beam 62d continues in the direction of arrow 81 and is incident on beamsplitter 70 where about twenty-five percent is reflected in the direction of arrow 88 to form output beam 35. By selecting different values of reflection and transmission for beamsplitters 70, 72, and 74 different output levels may be obtained in output beams 34, 35, 36, 37, and 38.

Figures 5, 6A:
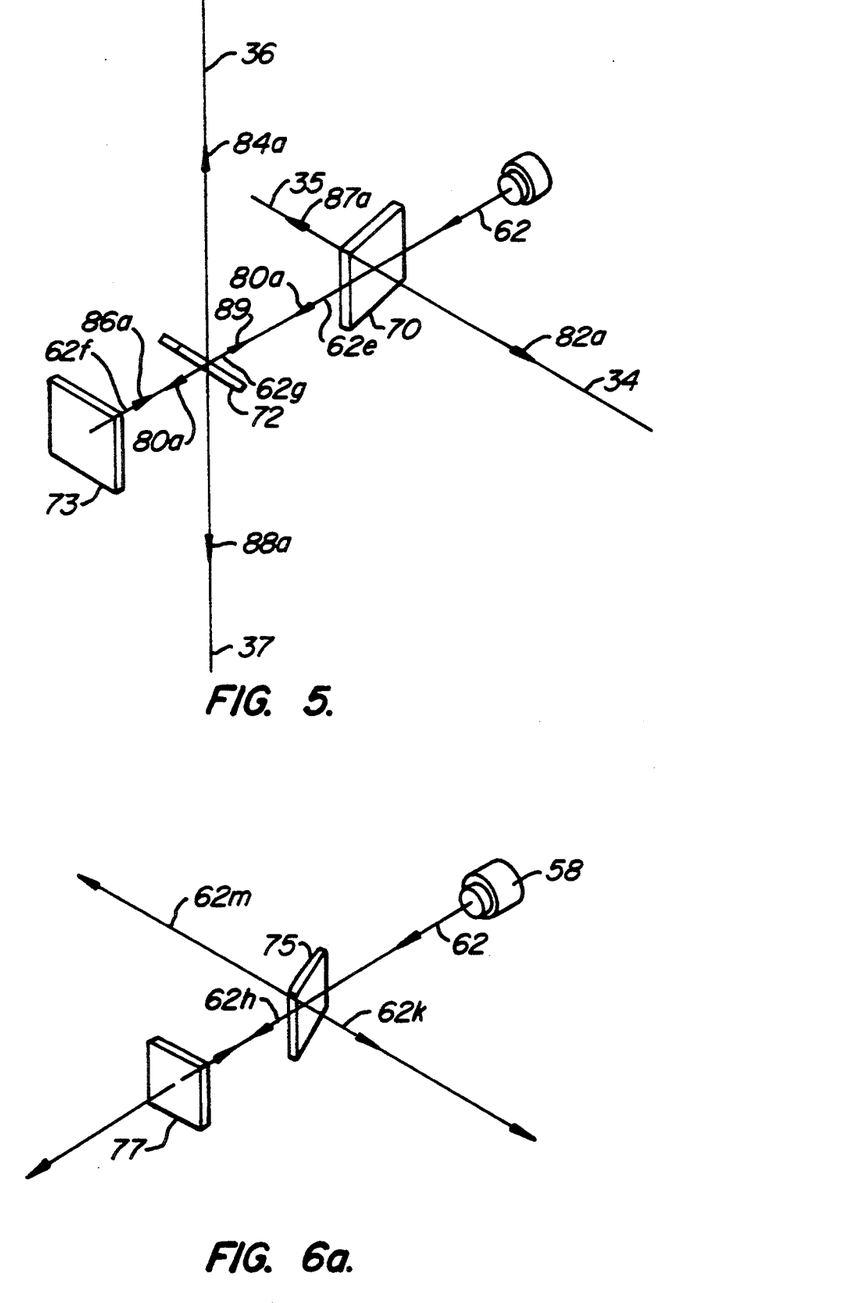
FIG. 5 schematically illustrates an optical system for dividing a collimated beam into four output beams.
FIG. 6a schematically illustrates an optical system for dividing a collimated beam into three beams for indicating level and square.

An optical system may be configured to produce less than five output beams. This may be necessary if more optical power per output beam is required. An optical system having four output beams is shown in FIG. 5. Here collimated beam 62 is incident on beamsplitter 70 and about twenty-five percent of beam 62 is reflected in the direction of arrow 82a to form output beam 34.

About seventy-five percent of collimated beam 62 is transmitted by beamsplitter 70 and continues in the direction of arrow 80a as beam 62e. thirty percent of beam 62e is reflected by beamsplitter 72 in the direction of arrow 84a to form output beam 36. About seventy percent of beam 62e is transmitted by beamsplitter 72 in the direction of arrow 80a to a fully reflective mirror 73. The fully reflecting mirror 73 reflects beam 62f in the direction of arrow 86a. Beam 62f is incident on beamsplitter 72 where about thirty percent is reflected in the direction of arrow 88a to form output beam 37. About seventy percent of beam 62f is transmitted by beamsplitter 72 in the direction of arrow 89 a beam 62g. About twenty-five percent of beam 62g is reflected by beamsplitter 70 in the direction of arrow 87a to form output beam 35.

Figure 6B:
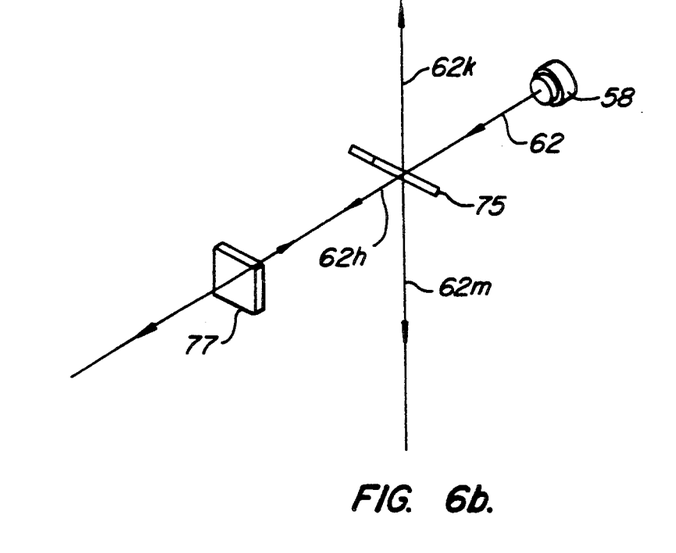
FIG. 6b schematically illustrates an optical system for dividing a collimated beam into three beams for indicating level and plumb.

In another embodiment of the present invention an optical system for projecting three alignment beams may be included in projection unit 50. Referring now to FIGS. 6a and 6b, here a single forty five degree beamsplitter 75 is used to divide collimated beam 62 into two beams 62h and 62k, oriented perpendicular to each other. Depending on the orientation of beamsplitter 75 about the direction of collimated beam 62, beams 62h and 62k may be projected to designate level and square if beamsplitter 75 is inclined at forty five degrees to horizontal (FIG. 6a), or plumb and level with beamsplitter 75 inclined at forty-five degrees to the vertical (FIG. 6b). A beamsplitter 77 normal to the direction of beam 62h may be used to retroreflect a portion of the light in beam 62h off beamsplitter 75 to provide a third beam 32m which may be used as a reference marker for the vertical direction.(FIG. 6b) or for the horizontal (or level) direction (FIG. 6a).

Figure 7:
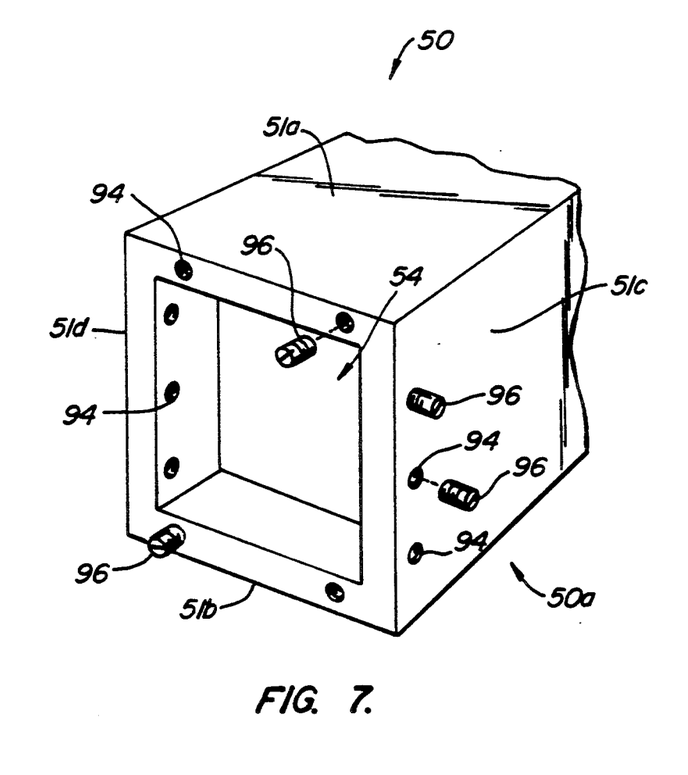
FIG. 7 schematically illustrates an arrangement of balancing screws for the projection unit of the present invention.

Projection unit 50 is designed such that when suspended from gimbal 52 it will balance so alignment beams 40 and 44 may be truly level, that is, horizontal. In practice, manufacturing tolerances may be such that projection unit 50 may not balance precisely as fabricated. Thus, it may be necessary to adjust the balance of projection unit after it has been assembled. Referring now to FIG. 7, end 50a of projection unit 50, i.e the end at which laser unit 54 is located, is provided with ten threaded holes 94. The holes may be sized to accommodate number #40 screws and are arranged such that two are bored into each of walls 51a and 51b of projection unit 50 and three are bored through each of walls 51c and 51d of the projection unit. Weight may thus be added to or removed from end 50a of projection unit 50 by adding or removing #40 grub screws 96. Thus the balance of projection unit 50 may be adjusted.

Projection unit 50 may be provided with a damping system to limit pendular motion when the tool is set down on a surface. As shown in FIGS. 2 and 3, the damping system may include a magnet 102 held in place in a permanent magnet holder 100 by a set screw 103. A round bowl-shaped copper plate 105 is mounted by a copper screw 104 on a cylindrical extension bracket 108. The cylindrical extension bracket 108 is attached to projection unit 50 by a screw 110. As such, copper plate 105 is rigidly suspended from projection 50. The copper plate 105 is formed and positioned such that a precise gap 101 is maintained at a predetermined width when it is in motion over magnet 102. Gap 101 is sufficiently small that motion of copper plate 105 over magnet 102 causes eddy currents to be generated in copper plate 105. Interaction of the eddy currents in copper plate 105 with the magnetic field of magnet 102 causes damping of pendular motion of projection unit 50. Damping force may depend on the mass and length of magnet 102, the dimension of gap 101 and the thickness of copper plate 105. Preferably magnet 102 is a neodymium magnet about one-half inch in diameter and about one-half inch in length. Copper plate 105 preferably has a thickness of about one-eighth of an inch. Gap 101 may have a width less than or equal to about one-sixteenth of an inch.

Referring again to FIGS. 2 and 3, laser diode 56 is powered by a rechargeable battery 120 located in a battery compartment 122 within housing 20. The battery is connected to the diode by a connector 124 extending from terminal 126. Connector 124 may be an ultraflexible microminiature conductor obtainable from New England Electric Wire Company of Lisbon, NH. Connector 124 is led to on-off switch 125, attached to housing 20. It is then led through the center of gimbal mount 52 and connected to laser diode 56. Leading connector 124 through the gimbal mount 52 as described ensures that connector 124 has a negligible effect on the balance of projection unit 50.

Figure 8:
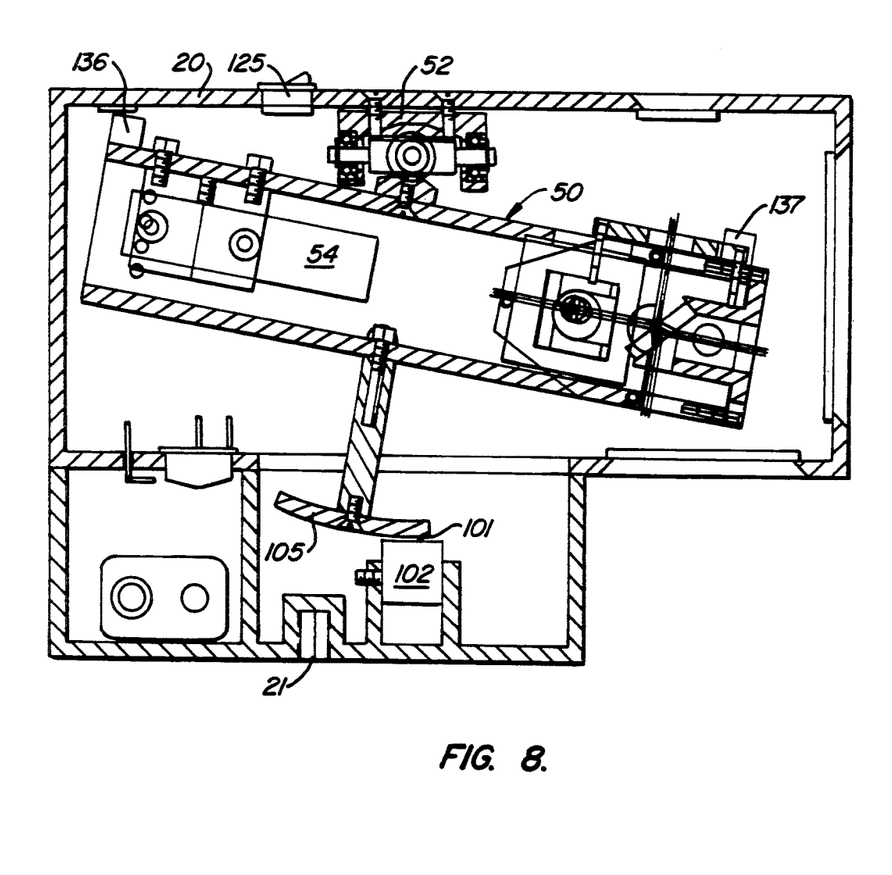
FIG. 8 is a cross sectional side elevation of the embodiment of FIG. 2, schematically illustrating means for limiting motion of the projection unit in the housing.

Provision is also made to prevent excessive motion of projection unit 50 when tool 18 is set down on a surface which is far from level For example, FIG. 8 illustrates the position of projection unit 50 when tool 18 is inclined, longitudinally, at about ten degrees (10°) or greater from the horizontal. Details of electrical connections, collimator and balancing system have been omitted from FIG. 8 for clarity. An energy absorbent stop 136 contacts an interior wall of housing 20 when projection unit 50 is inclined at about ten degrees thus limiting further relative movement between projection unit 50 and housing 20 if tool 18 is inclined at greater than ten degrees. A similar energy absorbent stop 137 is set to contact an interior wall of the housing if projection unit 50 is inclined at about ten degrees in the opposite direction. Similar energy absorbent stops 138 (see FIG. 3) are provided to limit motion of projection unit 50 when tool 18 is inclined laterally. Additionally, tool 18 may be provided a cut-off switch 127 which will cut off power to laser diode 56 when housing 20 is inclined in any direction plus or minus nine degrees from horizontal. Such a switch may be an omni-directional mercury switch obtainable from Comus International of Nutley, NJ. The method of connecting such a switch is well known to those familiar with the art, accordingly details of the wiring have been omitted to avoid confusion.

The present invention has been described in terms of a preferred embodiment and alternate embodiments The invention, however, is not limited to the embodiments described and depicted Rather, the scope of the invention is defined by the appended claims

What is claimed is:

1. An apparatus for projecting alignment lines, comprising:
   a housing;
   projection means, pendulously suspended in said housing, for projecting output beams;
   magnetic means for damping pendular motion of said projection means;
   said magnetic means including a magnet mounted in said housing below said projection means and a bowlshaped copper plate, rigidly suspended from said projection means such that said copper plate is positioned above said magnet with a gap therebetween sufficiently small that eddy currents are generated in said plate by motion thereof above said magnet;

said projection means including laser means for emitting visible light, collimator means for forming said visible light into a collimated beam, and optical means for dividing said collimated beam into at least three output beams; and said output beams being projected from said housing in different but generally perpendicularly related directions, whereby said output beams may be used as alignment lines.

2. An apparatus for projecting alignment lines, comprising:

a housing;

projection means, pendulously suspended in said housing, for projecting output beams;

means for damping pendular motion of said projection means;

said projection means including laser means for emitting visible light, collimator means for forming said visible light into a collimated beam, and optical means for dividing said collimated beam into at least four output beams; and said output beams projected from said housing in different but generally perpendicularly-related directions, whereby said output beams may be used as alignment lines for simultaneously indicating level, plumb and square.

3. The apparatus of claim 2 wherein at least two of said output beams are projected from said housing in opposite directions but substantially in alignment with each other.

4. The apparatus of claim 2 wherein said damping means are magnetic means.

5. The apparatus of claim 2 further including battery means for providing power to said laser diode means.

6. Apparatus for projecting alignment lines, comprising:

a housing;

projection means, pendulously suspended in said housing, for projecting output beams;

means for damping pendular motion of said projection means;

said projection means including laser means for emitting visible light, collimator means for forming said visible light into a collimated beam, and optical means for dividing said collimated beam into a first, second, third, fourth, and fifth output beams said first and second output beams projected from said housing in opposite directions but substantially in alignment with each other to form a first alignment line;

said third and fourth output beams projected from said housing in opposite directions but substantially in alignment with each other to form a second alignment line;

said fifth output beam projected from said housing to form a third alignment line; and said first, second, and third alignment lines having a generally perpendicular relationship with each other, whereby said alignment lines may be used to simultaneously indicate level plumb, and square directions.

7. The apparatus of claim 6 further including battery means for providing power to said laser diode means.

8. The apparatus of claim 7 wherein said damping means are magnetic means.

9. The apparatus of claim 8 wherein said magnetic means includes a magnet mounted in said housing below said projection means and a bowl-shaped copper plate, rigidly suspended from said projection means such that said copper plate is positioned above said magnet with a gap therebetween sufficiently small that eddy currents are generated in said plate by motion thereof above said magnet.

* * * * *